UNITED STATES PATENT OFFICE.

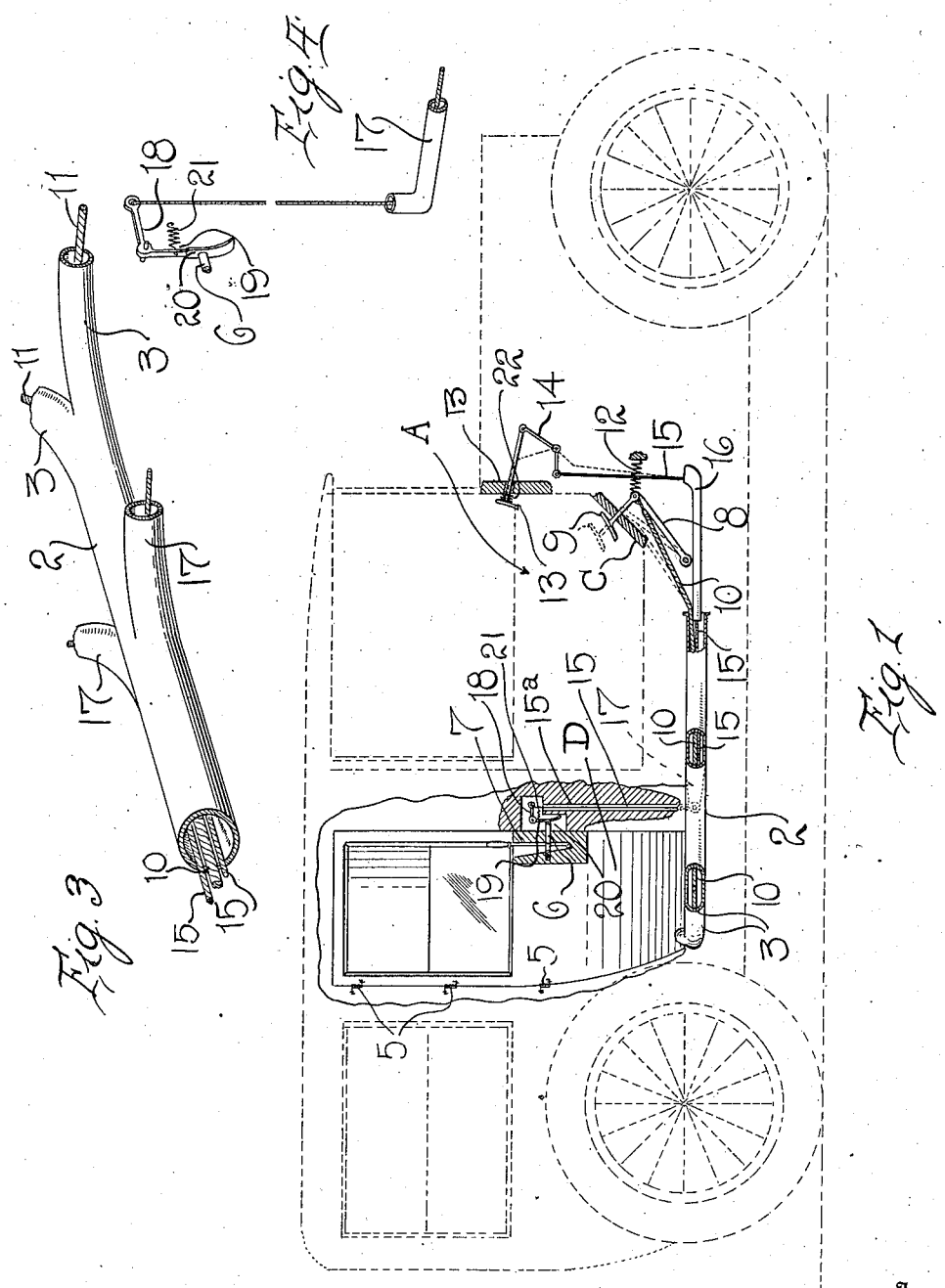

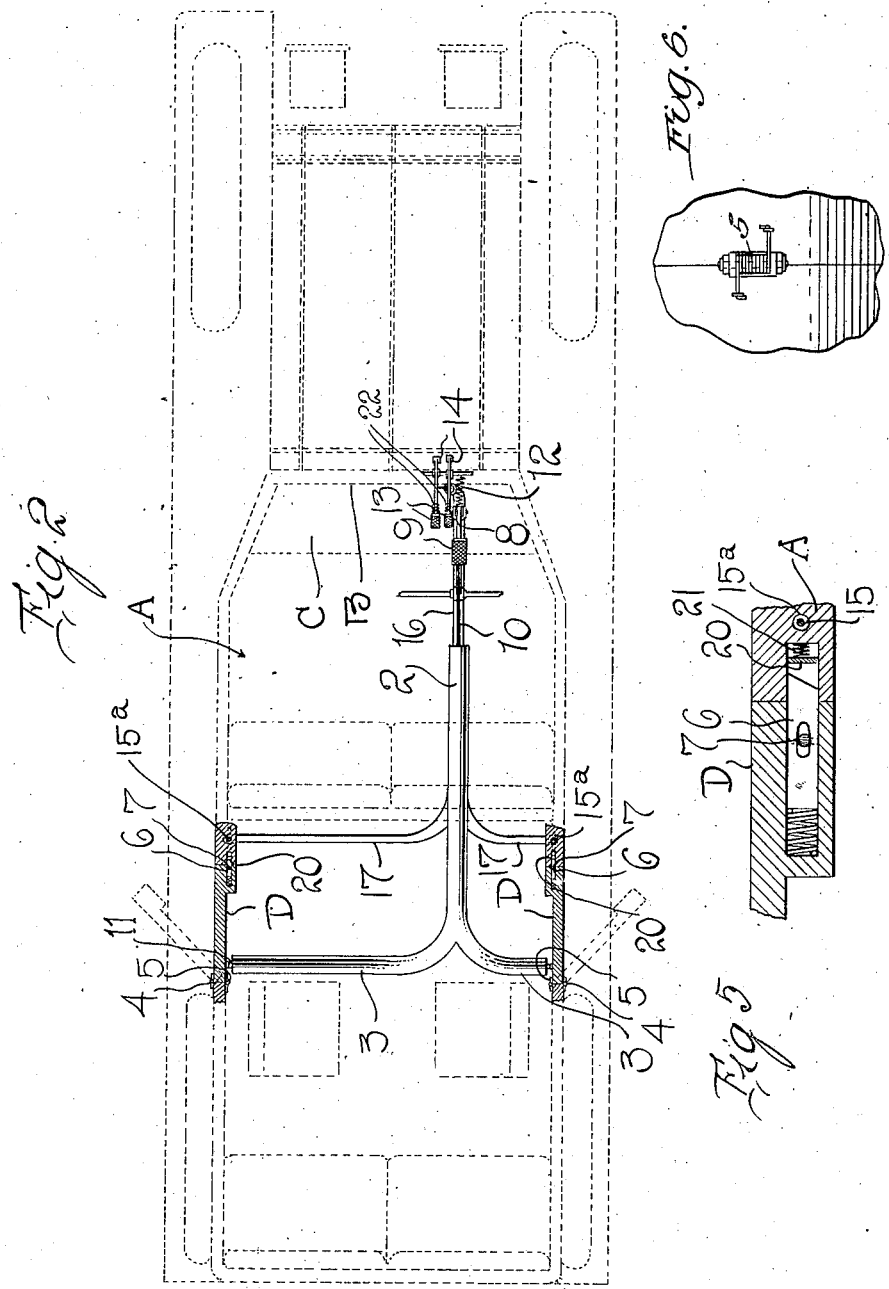

WILLIAM G. SODT, OF DUBUQUE, IOWA.

DOOR-OPERATING MECHANISM FOR AUTOMOBILES.

1,157,128. Specification of Letters Patent. Patented Oct. 19, 1915.

Application filed February 10, 1915. Serial No. 7,414.

*To all whom it may concern:*

Be it known that I, WILLIAM G. SODT, a citizen of the United States, residing at Dubuque, in the county of Dubuque and State of Iowa, have invented certain new and useful Improvements in Door-Operating Mechanism for Automobiles, of which the following is a specification, reference being had to the accompanying drawings.

My invention relates to door operating mechanism, and particularly to means for opening and closing the rear doors of automobiles.

The primary object of my invention is the provision of means of the character above described so constructed that the rear doors of automobiles may be operated from the front seat of the automobile.

A further object of the invention is the provision of a very simple mechanism easily applied to all automobiles of ordinary make whereby either one of the rear doors may be opened or closed by specific latch operating devices mounted forward of the front seat of the automobile whereby the latches of the rear doors may be operated, and door closing devices also disposed forward of the front seat whereby either one of the doors may be closed.

Other objects will appear in the course of the following description.

My invention is illustrated in the accompanying drawings, wherein—

Figure 1 shows a side elevation in dotted lines of an automobile and in full lines my mechanism applied to one of the rear doors thereof; Fig. 2 is a plan view of the construction shown in Fig. 1; Fig. 3 is a perspective detail view of the cable inclosing tube 2; Fig. 4 is a perspective detail view of the latch disengaging mechanism; Fig. 5 is an enlarged sectional view of a portion of the door D, the latch 6 and the latch disengaging mechanism. Fig. 6 is a detail fragmentary view of one of the doors and the adjacent casing and showing the springs whereby the door is caused to open.

Referring to these drawings, A designates an automobile of any usual or ordinary make, and having the dash board B, the foot board C and the rear doors D.

Disposed beneath the floor of the automobile and extending longitudinally therealong is a tubular casing 2 which opens at its forward end adjacent the foot board and which at its rear end has two divergently extending branches 3 leading respectively to a point above the floor and adjacent the hinge ends of the doors D. Each of these doors is constructed in the same manner and operated in the same manner by common operating means, hence the description of one door applies to the other. Each of these doors D is hinged to the body of the automobile by means of the hinges 4, and each door is urged to an open position by means of springs 5 of any suitable character. Each door is held closed by means of a spring actuated latch bolt 6 which may be manually retracted by means of the usual operating lever 7 disposed within a recess in the open or inner face of the door D. All of these parts are as usually constructed.

Preferably disposed beneath the foot board C is a lever 8 which is pivotally mounted at its lower end and whose free end carries a pedal 9 whose shank projects through the foot board, the pedal being placed in convenient position to the foot of the driver. To the lever 8 is connected a cable 10 which extends through the tube 2 and which has branches 11 extending out through the branches 3 and attached to the hinge side of the respective doors, the cable being fastened to the door about one inch from the edge so as to give sufficient leverage to close the door. It will now be understood that a pressure upon the pedal 9 will cause a retraction of the cable 10, which in turn will close either or both of the doors against the action of the springs 5. In order that the pedal 9 shall not protrude unduly beyond the foot board C and be in the way of the operator, a light spring 12 is preferably attached to the lever 8 in such manner as to withdraw the pedal 9. This spring, however, is considerably lighter than the springs which act to open the doors, and therefore this spring 12 does not prevent the automatic opening of the rear doors when the latch bolts 6 are released.

For the purpose of releasing the latch bolts 6 of the doors I provide in any suitable position on the automobile forward of the front seat and preferably upon the dash board B the pedals 13, each connected at its lower end to a bell crank lever 14, to the other arm of which is connected a cable 15. These cables both pass downward through the dash board, which may be formed with passages for the purpose, to a relatively light and relatively small tube 16 which extends rearward beneath the floor of the car and opens into the casing or tube 2. The cables 15 then pass into this casing or tube 2, and from the tube 2 extend branch tubes 17 through which these cables 15 respectively pass, the tube 17 running to the bolt edge of each door. The cables then pass upward through the hollow side walls of the car, as indicated at 15ª and are then each connected to the rearwardly extending arm of a bell crank lever 18, the downwardly extending arm 19 of which is formed with a head 20 adapted to project into the bolt recess and engage with the end of the bolt 6 when the bell crank lever 18 is operated so as to force the bolt rearward free from engagement with the bolt recess and permit the door to be opened under the action of the spring 5. A light spring 21 is connected to the horizontal arm of the bell crank lever and normally holds the downwardly extending arm 19 retracted from engagement with the bolt 6. A spring 22 is also disposed upon the dash board in such a position as to urge the projection of the corresponding pedal 13. It will now be obvious that upon a depression of one or the other of the pedals 13 one or the other of the operating cables 15 will be retracted, thus actuating the corresponding bell crank lever 18, and thus forcing the corresponding latch 6 outward from its keeper and permitting the door to open under the action of the spring. When the door opens under the action of the spring 5 the cable 10 and one of the branches 11 of the cable will be drawn taut, causing the projection of the pedal 9. When it is desired to close the door the pedal 9 is depressed, retracting the cable 10 and the branch connected with the open door, and causing the door to close against the action of the spring 5. The latch bolt is slightly beveled at its end so that it may be pushed back easily when the door is being closed and when the bolt contacts with the wall of the keeper.

My invention, it will be seen is very simple and permits the opening and closing of the door from the front seat. Thus the chauffeur does not have to leave the front seat of the vehicle in order to open or close the door. The doors are at all times entirely under the control of the chauffeur, and yet the rear doors may be readily opened or closed by the occupants of the rear seat if desired.

While I have illustrated what I believe to be the best form of my invention, I wish it to be understood that I do not wish to be limited thereto as it is obvious that many changes might be made therein without departing from the spirit thereof.

Having described my invention, what I claim is:

1. The combination with a vehicle having doors and a spring urging the opening of said doors; of a tube having branches opening adjacent the hinged edges of the doors, a cable in said tube having branches connected to the hinged edges of the doors, a pedal operatively connected to the cable whereby the cable may be retracted to close the doors against the action of the springs, a latch mounted upon the door and engaging with the side wall of the vehicle, and pedally actuated means for shifting the latch from its engagement with the wall of the vehicle.

2. A vehicle having a pair of doors, springs urging said doors to open position, latching members coacting with each door and normally holding them closed, a tube disposed beneath the floor of the vehicle and extending from the front of the vehicle rearward and having branches extending toward the hinged side of each door and also having branches extending toward the free edge of each door, a cable disposed within said tube and having branches extending through the first named branches and operatively connected to the respective doors at the hinged sides thereof, a pedal mounted in the forward portion of the automobile and operatively connected to said cable to cause its retraction upon a depression of the pedal to thereby cause the closing of the doors against the action of said springs, independent latch operating means disposed in the forward portion of the vehicle, and cables extending from said operating means through said tube and through the second named branches and being connected to said latching device.

In testimony whereof I hereunto affix my signature in the presence of two witnesses.

WILLIAM G. SODT.

Witnesses:
C. H. REYNOLDS,
JNO. KEISER.